Feb. 26, 1935. W. BEAUCLERK 1,992,166
SLICED LOAF BAGGING DEVICE
Filed Nov. 3, 1933   3 Sheets-Sheet 3
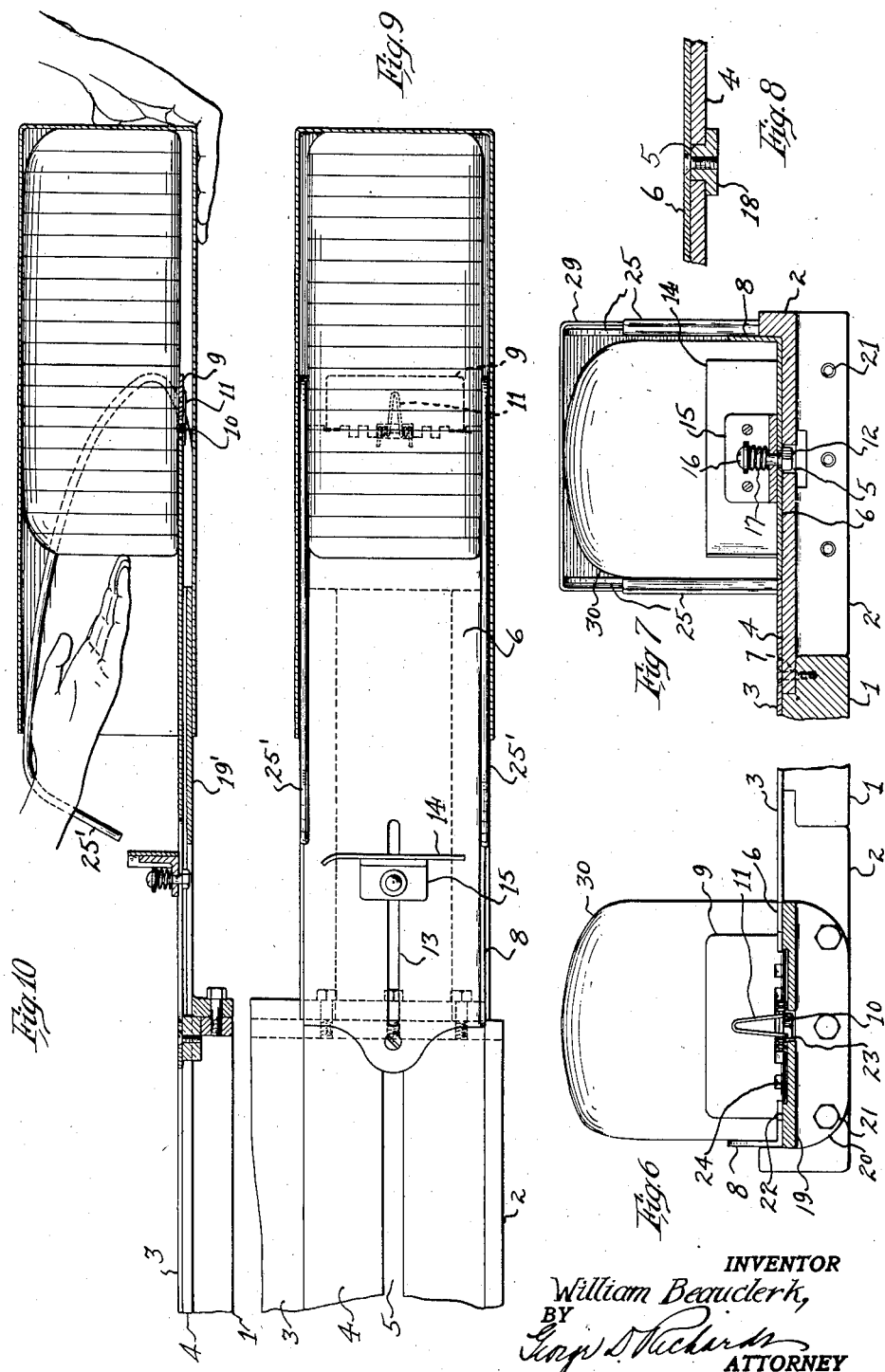
INVENTOR
William Beauclerk,
BY
ATTORNEY Patented Feb. 26, 1935

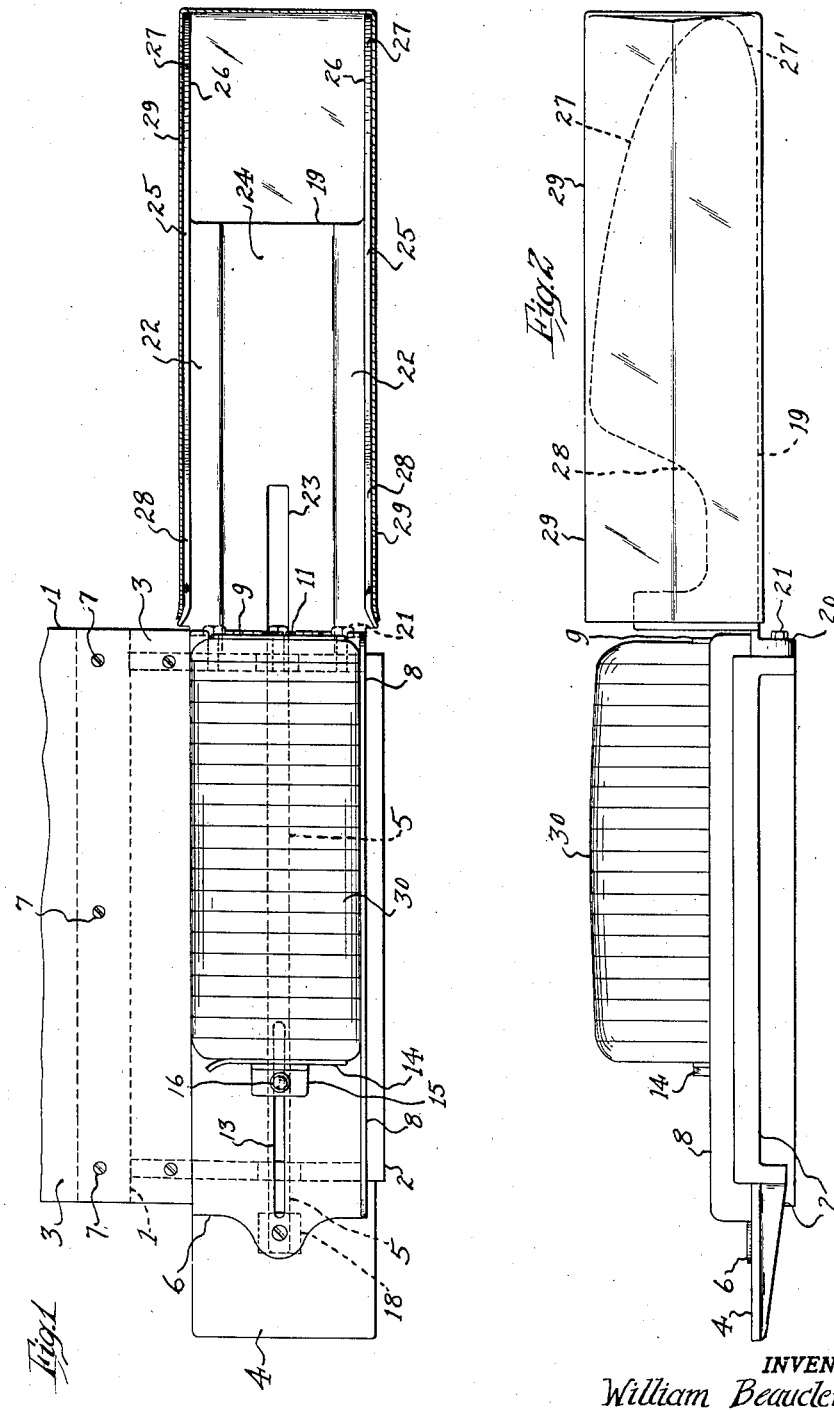

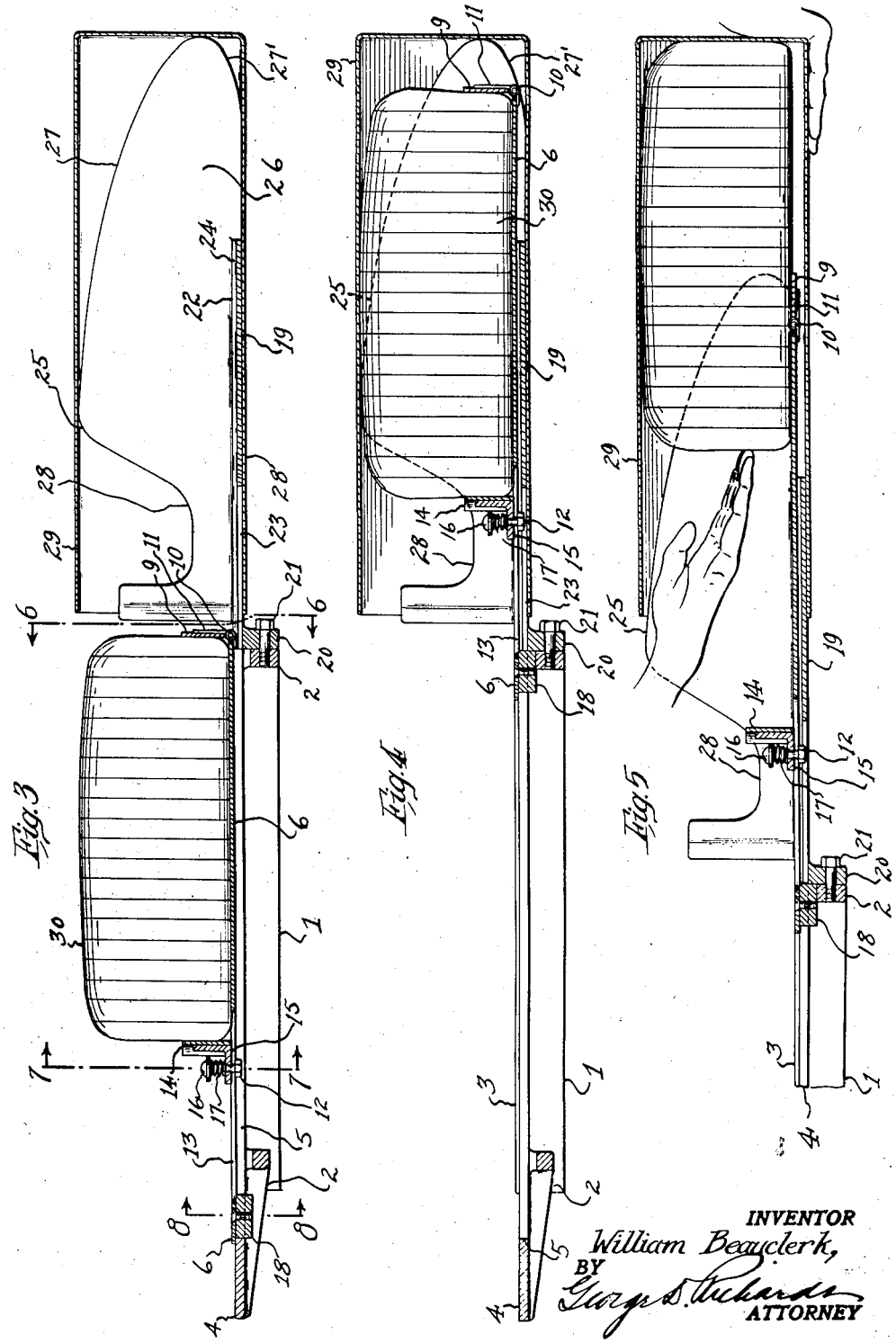

1,992,166

UNITED STATES PATENT OFFICE 1,992,166

SLICED LOAF BAGGING DEVICE

William Beauclerk, Irvington, N. J., assignor to Pure Made Products Co., a corporation of New Jersey Application November 3, 1933, Serial No. 696,552

6 Claims. (Cl. 226—18)

This invention relates, generally, to the wrapping of bread loaves, and the invention has reference, more particularly, to a novel device for use in inserting presliced bread loaves into containing bags.

It has recently become popular to preslice loaves of bread before wrapping and delivering the same to the public. There are a number of slicing machines on the market which slice the bread loaves and deliver the same successively to a platform at the front of the machine. Heretofore, the sliced loaves have been removed from this platform and then hand wrapped, or inserted into bags by hand.

The principal object of the present invention is to provide a novel sliced loaf bagging device so constructed and arranged as to enable the easy and quick insertion of presliced bread loaves into a bag or other container, the said device serving to reduce manual handling of the bread loaves to a minimum.

Another object of the present invention lies in the provision of a novel sliced loaf bagging device having a carriage means adapted for receiving presliced loaves and being movable to insert such loaves into containers or bags; the said device being simple and inexpensive and yet exceedingly effective for the purpose for which it is designed.

Other objects of this invention, not at this time more particularly enumerated, will be clearly understood from the following detailed description of the same.

The invention is clearly illustrated in the accompanying drawings, in which:

Fig. 1 is a plan view of the novel sliced loaf bagging device of this invention, the said device being shown attached to the delivery platform of a slicing machine and illustrated as having a loaf of presliced bread thereon ready to be inserted into a receiving bag.

Fig. 2 is a view in elevation of the structure shown in Fig. 1.

Fig. 3 is a view similar to Fig. 2 but with parts broken away.

Fig. 4 is a view similar to Fig. 3, but shows the carriage of the device, together with the bread loaf carried thereby, inserted into the receiving bag.

Fig. 5 is a fragmentary sectional view illustrating the manner of removing the bread loaf from the carriage.

Fig. 6 is a sectional view taken along line 6—6 of Fig. 3.

Fig. 7 is a sectional view taken along line 7—7 of Fig. 3.

Fig. 8 is a fragmentary sectional view taken along line 8—8 of Fig. 3, and

Figs. 9 and 10 are fragmentary elevational and plan views, respectively, of a slightly modified construction.

Similar characters of reference are employed in said views, to indicate corresponding parts.

Referring now to Figs. 1 to 8 of said drawings, the reference numeral 1 designates the forward portion of a bread slicing machine having a flat top plate or platform 3 serving to receive loaves of bread sliced by the machine. The novel loaf bagging device of this invention is illustrated as having a base 2 provided with a flat top portion 4 attached to the slicing machine 1 as by screws 7. It is to be understood, however, that the loaf bagging device of this invention may be removed from and used independently of the slicing machine and as an aid in packing the sliced loaves taken from such machine. The flat top 4 of base 2 is provided with a longitudinal, centrally located slot 5 extending from one end thereof for the greater part of the length of this base.

A carriage 6, preferably made of sheet metal, is mounted for longitudinal movement on the top 4 of base 2. The rear edge of carriage 6 abuts the forward edge of platform 3 and the upper surface of carriage 6 is flush with the upper surface of platform 3 so that sliced bread loaves may be readily slid off the slicing machine platform 3 and onto the carriage 6. The forward portion of carriage 6 is formed with an upturned stop flange 8 that serves to limit or stop the forward movement of a bread loaf when the same is slid upon carriage 6.

A guide block 18 (see especially Fig. 8) is secured to the under surface of carriage 6 and projects downwardly through slot 5 in base 2. The guide block 18 is of inverted T shape and engages the undersurface of top portion 4 so as to retain carriage 6 upon top portion 4, while this guide block also cooperates with slot 5 in guiding carriage 6 when the same is moved longitudinally over top portion 4.

As especially shown in Figs. 3, 4 and 6, one end of the carriage 6 has a gate 9 hingedly connected thereto as by a hinge pintle 10. A coil torsion spring 11 is mounted on pintle 10 and urges gate 9 in a counter clockwise direction as viewed in Fig. 3, thereby normally holding this gate in a vertical position, in which position the lower edge of the gate 9 abuts the carriage 6, thereby preventing spring 11 from turning the gate past its vertical position shown. The other end portion of the carriage 6 has a centrally located longitudinal slot 13 therein overlying the slot 5 in the top portion 4 of base 2.

An upstanding plate member 14 is positioned over the slot 13 and has a bracket 15 secured thereto. A bolt 16 extends through an aperture in bracket 15 and through slot 13, the shank of bolt 16 projecting into the wider slot 5 of base top 4 and having a nut 12 thereon for engaging the underside of carriage 6. A coil compression spring 17 is interposed between the head of bolt 16 and bracket 15 and serves, by urging bolt 16 upwardly so that nut 12 grips the bottom of carriage 6, to hold bracket 15 and hence the plate member 14 in any position these members may be placed along slot 13. By pressing downwardly upon the head of bolt 16 against the tension of spring 17, the bracket 15 together with plate member 14 may be moved toward or away from the gate 9 to thereby accommodate bread loaves of various lengths between the plate member 14 and gate 9.

A base extension member or shelf 19 has a depending flange 20 adjoining one end of base 2 and this extension member 19 is attached to base 2 as by screws 21 extending through flange 20 and threaded into base 2. The base extension member or shelf 19 is of the same width as carriage 6 and the upper surface 22 of the extension member is flush with the upper surface of the base top portion 4 so that carriage 6 may readily slide from base 2 onto the extension member 19. The base extension member 19 has a longitudinal slot 23 extending from its end adjoining base 2 for a portion of its length. Slot 23 is in reality a continuation of slot 5 in base top portion 4 and accommodates movement of nut 12 as carriage 6 moves over base extension 19. The central upper surface portion of extension 19 is depressed somewhat at 24 so as to accommodate movements of the hinged connection of gate 9 to carriage 6.

Extension 19 is provided at its front and rear edges with upstanding bag guiding and supporting arms 25. The free end portions 26 of arms 25 project beyond the end of the extension 19 and have converging upper and lower edges 27 and 27' to facilitate the insertion of these arms into the open mouths of bags. The arms 25 are also cut away somewhat as shown at 28 to accommodate the user's hand.

In use, when a loaf of bread 30 is delivered onto platform 3 it is moved forwardly by the operator so as to enter the space between gate 9 and plate 14, the latter having been previously adjusted along slot 13, if necessary, to accommodate the length of the loaf. As long as one size of loaf is being handled, it will not be necessary to change the position of plate 14 on carriage 6. Plate 14 and gate 9 cooperate with the stop flange 8 of carriage 6 in retaining the slices making up the bread loaf in proper assembled relation. A bag 29 is telescoped over the supporting arms 25 into the position shown in Figs. 1 to 3 of the drawings, in which position these arms and the extension 19 serve to support the bag for receiving the bread loaf. This telescoping of the bag on arms 25 may be done either before or after the bread loaf is inserted between members 9 and 14. The operator then moves the carriage toward the right from the position shown in Fig. 3, causing the carriage and loaf carried thereby to enter the bag 29 as especially shown in Fig. 4. This movement of the carriage may be accomplished by pressing upon the plate 14, if desired. The movement of the carriage 6 to the right is limited or stopped by guide block 18 engaging flange 20 of extension member 19.

After the loaf has thus entered the bag 29, the operator inserts one hand through the open bag mouth so as to engage and press against the end of the loaf with his fingers, while his other hand engages the bag bottom in supporting relation. He then pushes the loaf from left to right, as viewed in Fig. 5, the bag 29 being drawn off of the arms 25 and the loaf slid endwise off of the carriage 6. During this operation, the gate 9 will yield or turn downwardly to permit the loaf to pass over the same. When the loaf 30 with the bag has thus been removed, the open end of the bag may be closed over the exposed end of the loaf and the bagging operation is completed. The carriage 6 may then be slid from right to left as viewed in Fig. 5, to thereby return the same to its initial position for receiving another loaf preparatory to bagging the same.

If desired, instead of using the solid metal bag supporting arms 25, I may use arms made of suitably bent wire, as shown in Figs. 9 and 10. In these figures the arms 25' are made of bent wire, the same being fastened at their lower ends, as by soldering, to the edges of the extension 19'. When using the wire arms 25' the operation is the same as has already been described in connection with Figs. 1 to 8.

While the invention herein described is intended for use in bagging bread loaves, the said invention is not limited to this particular use since it is equally applicable for bagging other products such as cake, biscuits, etc.

As many changes could be made in the above construction and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim:

1. A sliced loaf bagging device comprising, a movable carriage having a horizontal loaf supporting surface, a member extending upwardly from said loaf supporting surface for engaging the end of a loaf thereon, a stationary support for said carriage, means comprising supporting arms mounted in connection with said support for receiving and holding a bag in open condition, said carriage being movable over said support and into a bag held by said supporting arms for conveying the loaf into such bag, said loaf engaging member being yieldable upon the application of pressure to the exposed end of the bread loaf, thereby enabling such loaf to pass off said carriage along with the bag.

2. A sliced loaf bagging device comprising, a carriage having a horizontal loaf supporting surface, a gate on one end portion of said carriage, resilient spring means for normally holding said gate in an upright position, an upstanding plate member mounted on said carriage in opposition to said gate and adjustable toward and away from said gate, whereby the space between said gate and said plate member is arranged to receive bread loaves of varying sizes, a support over which said carriage is slidable, and means mounted in connection with said support for holding a bag so that its mouth is directed toward the gate end of said carriage, said carriage being movable into the bag for delivering a bread loaf into the latter, said gate being turnable to a horizontal position upon the application of finger pressure to the exposed end of the bread loaf, thereby enabling the bread loaf to be slid off of said carriage along with the bag.

3. A sliced loaf bagging device comprising, a carriage having a horizontal loaf supporting surface, a gate on one end portion of said carriage, resilient spring means for normally holding said gate in an upright position, an upstanding plate member mounted on said carriage in opposition to said gate and adjustable toward and away from said gate, whereby the space between said gate and said plate member is arranged to receive bread loaves of varying sizes, a support over which said carriage is slidable, and bag supporting members mounted in connection with said support for extending into the open mouth of a bag to hold the bag in open condition and in alignment with said carriage, the open mouth of the bag being adjacent the gate of said carriage, said carriage being movable into the open mouth of said bag for delivering a bread loaf into the latter, whereupon the application of pressure to the exposed end of the bread loaf causes the loaf to depress said gate to a horizontal position and pass off said carriage along with the bag.

4. A sliced loaf bagging device comprising, a movable carriage having a loaf supporting surface, spaced loaf confining plate members extending outwardly from said surface adjacent the ends thereof for holding a bread loaf therebetween, a stationary support for said carriage, bag supporting arms mounted in connection with said support for receiving and holding a bag in open condition, said bag supporting arms having converging free end portions to facilitate their entrance into the bag, said carriage being longitudinally movable over said support and into the bag held by said supporting arms for delivering the loaf into such bag, one of said loaf confining plate members being yieldable upon the application of finger pressure to the exposed end of the bread loaf, thereby enabling such loaf to pass off said carriage along with the bag.

5. A sliced loaf bagging device comprising, a base, a horizontal carriage mounted on said base for movement thereover and outwardly beyond the edge of said base, stop means for limiting the outward movement of said carriage, a gate hingedly connected to the outer end of said carriage, spring means for normally holding said gate in a vertical position to serve as one confining member for a bread loaf, a second confining member for the bread loaf mounted on said carriage and adjustable toward and away from said gate to thereby accommodate various sizes of loaves, a pair of spaced bag supporting arms mounted in connection with said base for receiving and holding a bag in open condition and in alignment with said carriage, said bag supporting arms having converging free end portions to facilitate their entrance into the bag, the outward movement of said carriage with a loaf thereon serving to deliver the loaf into the bag, whereupon, the exertion of finger pressure on the exposed end of the loaf serves to cause the loaf to open said gate against the tension of said spring means, thereby enabling said loaf to pass off said carriage along with the movement of the bag off of said supporting arms.

6. A sliced loaf bagging device comprising, a movable carriage having a loaf supporting surface, upstanding stop means on said carriage engaging the ends of a bread loaf for suitably positioning the bread loaf thereon, bag distending arms for receiving the body of a bag thereover and cooperable with said carriage, said carriage being movable in between said bag distending arms to thereby deliver the bread loaf into the bag body surrounding said arms said stop means comprising a member that is yieldable upon the application of pressure to the exposed end of the bread loaf, thereby enabling such loaf to pass off said carriage along with the bag.

WILLIAM BEAUCLERK.